Dec. 10, 1968     A. J. SHONES     3,415,043
ANTI-SCALPING DEVICE FOR ROTARY LAWN MOWERS
Filed May 5, 1966     2 Sheets-Sheet 1
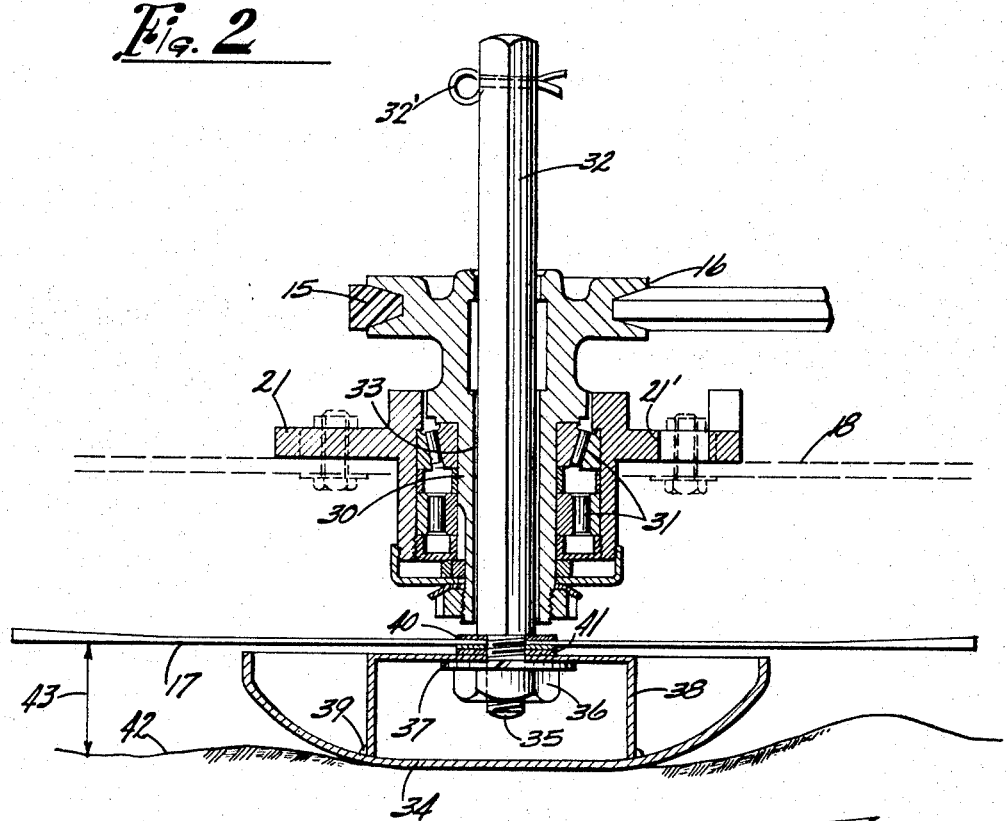
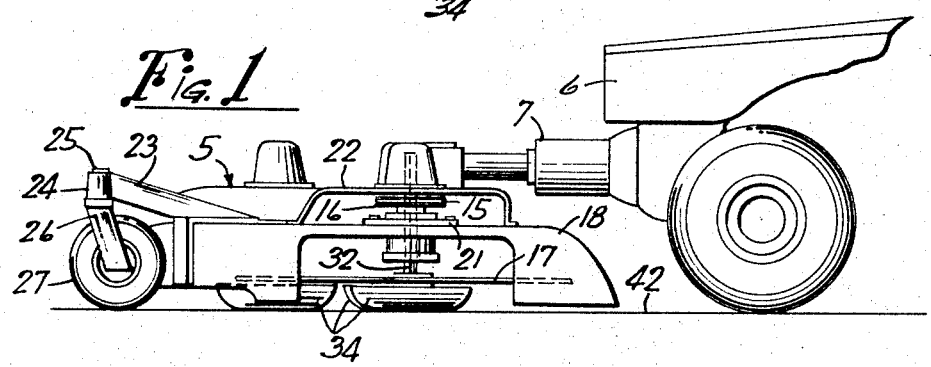

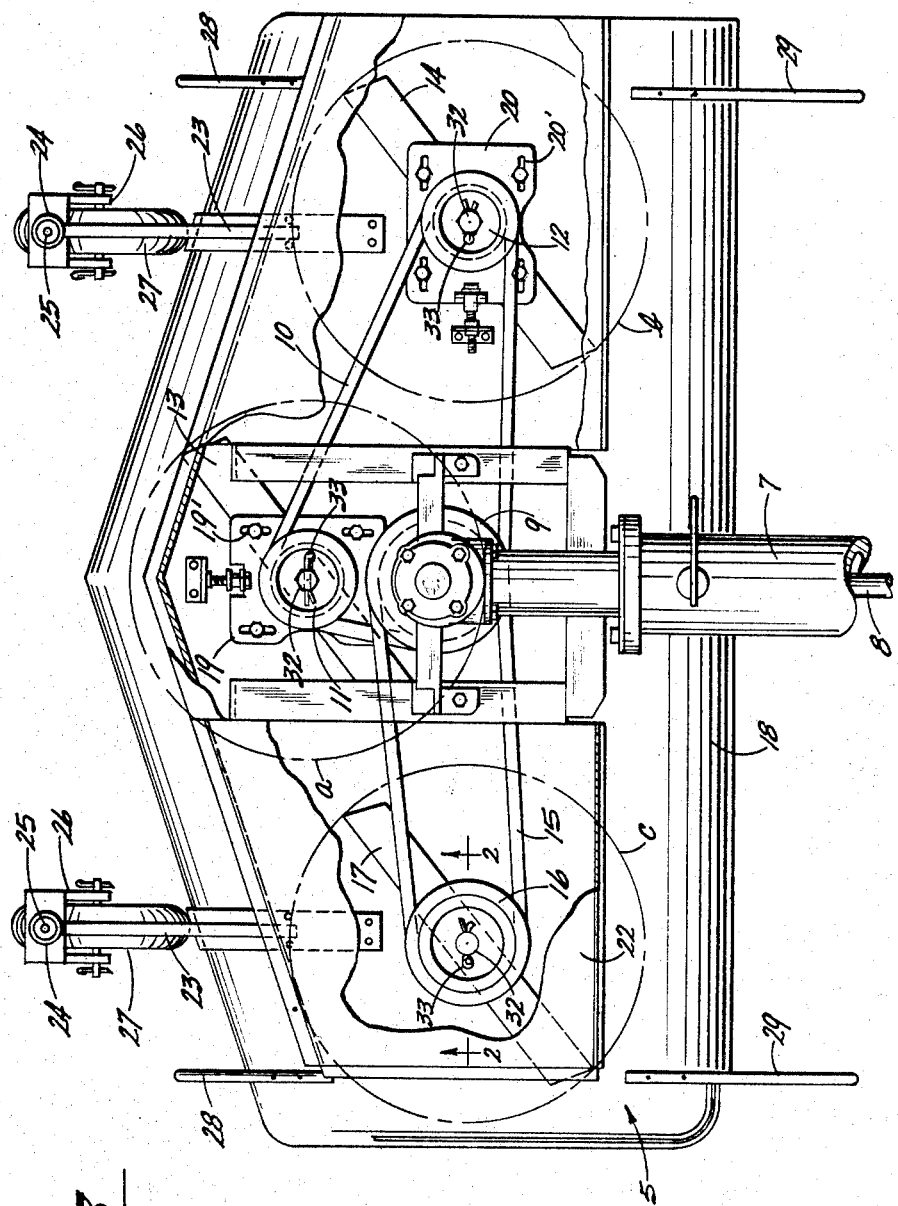

United States Patent Office 3,415,043
Patented Dec. 10, 1968

3,415,043
ANTI-SCALPING DEVICE FOR ROTARY
LAWN MOWERS
Arnold J. Shones, 1208 Toft, Rockford, Ill. 61111
Filed May 5, 1966, Ser. No. 547,845
9 Claims. (Cl. 56—25.4)

This invention relates to an anti-scalping device for rotary lawn mowers.

One of the main objections to rotary mowers has been the tendency to "scalp" high spots, where the ground is a little uneven and, of course, that ruins the turf and leaves bare spots in the lawn. I am aware that efforts have been made to avoid this difficulty, but, to my knowledge, there has not been a truly practical solution proposed. It is, therefore, the principal object of my invention to mount the rotary blade on a vertically slidable drive shaft riding at its lower end on a dished member disposed in concentric relation to the blade and beneath it and adapted to ride up on high spots so that the rotary blade rises and falls independently of the wheels supporting the mower, whereby to minimize the danger of scalping without unnecessarily complicating the construction of the mower.

The invention is illustrated in the accompanying drawings, in which:

FIG. 1 is a side view of a rotary mower equipped with anti-scalping means in accordance with my invention;

FIG. 2 is a vertical section taken on the line 2—2 of FIG. 3; and

FIG. 3 is a top view of the mower shown in FIG. 1 with portions of the housing of the mower broken away to better illustrate the arrangement of three rotary cutter blades, each equipped with the anti-scalper feature of FIG. 2, this view serving also to show how all three blades are driven from a central double pulley.

The same reference numerals are applied to corresponding parts throughout these views.

The invention is herein described as applied to a rotary mower having three rotary cutter blades arranged so that the swaths cut thereby overlap sufficiently to avoid steps, but it will be understood that the invention is not limited to such an application but is also adapted for use with mowers having a single rotary cutter blade.

Referring to the drawings, the reference numeral 5 designates the rotary mower generally as an attachment on the front end of a tractor 6 from which a rigid hollow neck 7 extends forwardly both for support of the mower from the rear, on the center line thereof, and also as a housing through which a power take-off shaft, indicated at 8, extends to a bevel gear (not shown) meshing with another bevel gear (not shown) to transmit drive from the engine on the tractor to the central double drive pulley 9 on the mower 5. Drive is transmitted from the upper pulley at 9 by belt 10 in one horizontal plane to pulleys 11 and 12 for driving rotary cutter blades 13 and 14, respectively, while another belt 15 operating on the pulley at 9 in a parallel horizontal plane transmits drive to a third pulley 16 for driving the third rotary cutter blade 17. The circles a, b, and c swept by blades 13, 14, and 17, respectively, are so arranged, as seen in FIG. 3, that the swaths cut by the blades overlap sufficiently to eliminate any steps in the mowing. A main generally rectangular dished sheet metal housing 18 encloses the three rotary cutter blades from the sides and above and provides support on the top thereof for bearing plates 19, 20, and 21 for mounting the pulleys 11, 12, and 16, respectively, these being adjustable as indicated at 19', 20', and 21' to permit easily tightening the belts. Additional housings, like that indicated at 22 in FIG. 3, are suitably provided on top of housing 18 to enclose the pulleys 11, 12, and 16. Two brackets 23 are fixed to the front of and extend forwardly from the housing 18 on opposite sides of center and carry bearings 24 on their front ends in which vertical shafts 25 carrying forks 26 for caster wheels 27 operate, whereby to maintain a predetermined level for the housing so the mower cuts the grass to the desired length. Guards 28 and 29 extend forwardly and rearwardly from the housing 18 at opposite ends to brush aside loose objects that might otherwise either damage or foul up the cutter blades or be thrown thereby if allowed to come into contact therewith. These guards also help to guide the operator in keeping the mower running on a line so as not to leave unmowed strips that would necessitate a return run over the same area previously mowed.

Each of the pulleys 11, 12, and 16 has an elongated sleeve 30 either fixed to or integral therewith and running in anti-friction bearings 31 provided in the bearing plates 19, 20, and 21, and a shaft 32 of hexagonal cross-section has a free working fit in a hexagonal bore 33 provided in the pulley and its sleeve extension whereby to transmit drive to the associated rotary cutter blade 13, 14, or 17 in any position of up and down adjustment of the shaft relative to the associated drive pulley, downward movement in each case being limited by the cutter pin 32' inserted in a hole in the upper end of the shaft. There is ample room between the lower end of each sleeve extension 30 and the top of the rotary cutter blades 13, 14, or 17 so that the floating drive shafts 32, which have cupped circular discs 34 fastened onto their reduced threaded lower end 35 by means of nuts 36 and lock washers 37 in concentric relation to the blades and thereunder will have ample range of movement to accommodate any anticipated amount of unevenness in the lawn being mowed. An inverted U-shaped yoke 38 is welded, as at 39, at the lower ends of the arms thereof to the inside of the cup 34 and has the reduced end 35 of the shaft 32 extending through a hole in the cross-portion thereof, and washers 40 and 41 are provided on the reduced end 35 of the shaft above and below the blade to space it properly with respect to the disc 34.

In operation, the rounded bottoms of the cupped discs 34 riding on the ground indicated at 42 below the rotary cutter blades 13, 14, or 17 keep the cutting edges of the blades always operating at approximately the dimension indicated at 43 above the ground level as the discs 34 ride over the high spots that might otherwise be scalped. The dimension 43 will be approximately the cutting dimension with respect to the high spots but it will never be less than this dimension and, of course, it is preferable to have the grass left a little deeper at the high spots than to have scalping occur, because the chances are that the slight steps in the mowing would be taken care of on the next pass of the mower anyway. Inasmuch as the rotary cutter blades 13, 14, and 17 each has its floating drive shaft 32 individually adjustably supported on its cupped disc 34 it is obvious that a slight hump in the lawn will affect only the blade 13, 14, or 17 whose disc 34 rides over it, thereby insuring much more evenness of mowing than where the whole mower was subjected to rising and falling in response to unevenness.

It is believed the foregoing description conveys a good understanding of the objects and advantages of my invention. The appended claims have been drawn to cover all legitimate modifications and adaptations.

I claim:

1. In a power mower comprising, in combination, a substantially horizontal open bottom housing, front and rear means supporting said housing in a predetermined elevation with respect to the ground over which the mower is to operate, a rotary cutter blade operable on a substantially vertical axis inside said housing, and power operated drive means for transmitting drive to said cutter blade, the improvement which consists in a vertical drive shaft that is in floating relation to said housing and drive means but provides the driving connection between said cutter blade and drive means in any position up or down from a previous position within a predetermined range of adjustability of said cutter blade relative to said housing and independently of said housing support means, and a rotary ground engaging cup-shaped spacer element fixed in concentric relation to and under said cutter blade and shaft to turn therewith and adapted to raise or lower said cutter blade and shaft in response to unevenness in the contour of the ground over which the mower is moved.

2. A power mower as set forth in claim 1 including means limiting upward movement of said shaft and cutter blade short of the housing so as to avoid contact of said blade with said housing.

3. A power mower as set forth in claim 1 including means limiting upward movement of said shaft and cutter blade short of the housing so as to avoid contact of said blade with said housing, and means limiting movement of said shaft in the opposite direction relative to said housing.

4. A power mower as set forth in claim 1 including an additional rotary cutter blade operating on a vertical axis in said housing in non-interfering relationship to said first mentioned rotary cutter blade and driven from the same power source and also equipped with a floating drive shaft and ground engaging cup-shaped spacer element under said blade as on the first mentioned shaft and cutter blade, the two floating shafts with cutter blades and cup-shaped spacer elements therebeneath being shiftable up and down independently of one another and independently of the housing and its supporting means.

5. A power mower as set forth in claim 1 including two additional rotary cutter blades in said housing with vertical floating drive shafts connected therewith and cup-shaped ground engaging spacer elements under the blades the same as on the first mentioned cutter blade, the three cutter blades being disposed at the three points of a triangle in non-interfering relationship to one another and so that the swaths cut by the three cutter blades overlap in the forward travel of said mower, the drive means being common to the three cutter blades and shafts.

6. A power mower as set forth in claim 1 including two additional rotary cutter blades in said housing with vertical floating drive shafts connected therewith and cup-shaped ground engaging spacer elements under the blades the same as on the first mentioned cutter blade, the three cutter blades being disposed at the three points of a triangle in non-interfering relationship to one another and so that the swaths cut by the three cutter blades overlap in the forward travel of said mower, the drive means being common to the three cutter blades and shafts, said drive means including a double pulley with one belt at one level on one pulley transmitting drive to two pulleys driving the floating drive shafts for two of said rotary cutter blades, and another drive belt on the other pulley at another elevation transmitting drive to another pulley transmitting drive to the third floating drive shaft for the third rotary cutter blade.

7. A power mower as set forth in claim 1 including two additional rotary cutter blades in said housing with vertical floating drive shafts connected therewith and cup-shaped ground engaging spacer elements under the blades the same as on the first mentioned cutter blade, the three cutter blades being disposed at the three points of a triangle in non-interfering relationship to one another and so that the swaths cut by the three cutter blades overlap in the forward travel of said mower, the drive means being common to the three cutter blades and shafts, said drive means including a double pulley with one belt at one level on one pulley transmitting drive to two pulleys driving the floating drive shafts for two of said rotary cutter blades, and another drive belt on the other pulley at another elevation transmitting drive to another pulley transmitting drive to the third floating drive shaft for the third rotary cutter blade, the power mower further including as a part of the housing support means a rigid substantially horizontal tubular support in rigid substantially right angle relationship to one side of said housing and adapted to be supported on a tractor, the tubular supporting having a power take-off shaft extending therethrough from the tractor as the power operated drive means for driving connection with said mower, and a pair of caster wheels mounted on brackets extending from the opposite side of said housing on opposite sides of the center lines thereof providing the rest of the housing support means.

8. A power mower as set forth in claim 1 including in combination with the floating drive shaft a drive pulley driven by a belt from the power operated drive means and mounted in a bearing on the top of said housing and having said floating drive shaft slidable but non-rotatable in a central bore provided therein.

9. A power mower as set forth in claim 1 including in combination with the floating drive shaft a drive pulley driven by a belt from the power operated drive means and mounted in a bearing on the top of said housing and having said floating drive shaft slidable but non-rotatable in a central bore provided therein, the pulley having an elongated concentric sleeve extension extending downwardly therefrom and mounted in said bearing on the top of said housing with the pulley disposed above said housing and the sleeve extension disposed in said housing, said sleeve having an elongated bore provided therein in which the floating shaft is slidably but non-rotatably engaged.

References Cited

UNITED STATES PATENTS

| 2,287,126 | 6/1942 | Packwood | 56—25.4 |
| 2,707,363 | 5/1955 | Beranek et al. | 56—25.4 |
| 2,870,592 | 1/1959 | Swanson | 56—25.4 |

FOREIGN PATENTS

| 665,196 | 4/1929 | France. |

RUSSELL R. KINSEY, *Primary Examiner.*

U.S. Cl. X.R.

56—6